US005336034A

United States Patent [19]

Hidding

[11] Patent Number: 5,336,034

[45] Date of Patent: Aug. 9, 1994

[54] METHOD AND APPARATUS FOR UNPACKING CONTENTS FROM ENVELOPES

[75] Inventor: Gerhard Hidding, Heerenveen, Netherlands

[73] Assignee: Hadewe B. V., Drachten, Netherlands

[21] Appl. No.: 983,051

[22] Filed: Nov. 30, 1992

[30] Foreign Application Priority Data

Nov. 29, 1991 [NL] Netherlands ........................ 9101120

[51] Int. Cl.$^5$ ........................................ B65G 21/02

[52] U.S. Cl. .................................. 414/403; 414/412; 414/786

[58] Field of Search ...................... 414/786, 403, 412

[56] References Cited

U.S. PATENT DOCUMENTS

| | | | |
|---|---|---|---|
| Re. 32,328 | 1/1987 | Russell . | |
| 3,116,718 | 1/1964 | Krupotich et al. . | |
| 3,238,926 | 3/1966 | Huck . | |
| 4,333,300 | 6/1982 | Russel | 414/412 X |
| 4,649,694 | 3/1987 | Haley | 414/412 X |
| 4,893,454 | 1/1990 | Russell . | |
| 4,921,388 | 5/1990 | Nelson | 414/412 |
| 4,934,892 | 6/1990 | Smith et al. | 414/412 |
| 5,096,360 | 3/1992 | Nelson | 414/412 |

FOREIGN PATENT DOCUMENTS

| | | |
|---|---|---|
| 0048485 | 3/1982 | European Pat. Off. . |
| 0459589 | 12/1991 | European Pat. Off. . |
| 346891 | 2/1905 | France . |
| 2135481 | 12/1972 | France . |
| 2358995 | 2/1978 | France . |

*Primary Examiner*—Cheryl L. Gastineau
*Attorney, Agent, or Firm*—Burns, Doane, Swecker & Mathis

[57] ABSTRACT

A method for unpacking contents from an envelope in which the envelope is at least weakened along three folding edges and a first panel of the envelope is folded over relative to a second panel about a fourth folding edge. The contents are separated from the envelope and are delivered, and the envelope is discharged separately from its contents. An envelope separated from its contents is discharged along a discharge track from which the envelope can be intercepted. Each time contents from an associated envelope are delivered, an interval of time follows before the associated envelope is discharged. An apparatus for unpacking contents from an envelope includes an arrangement for separating first and second panels of an envelope from one another along three folding edges, a device for separating an envelope from its contents, an arrangement for delivering the contents, and an arrangement for discharging an envelope separated from its contents to a discharge track at which the envelope can be removed from the discharge track. A control system activates the arrangement for discharging an envelope after passage of a time interval following delivery of the contents of the envelope.

8 Claims, 2 Drawing Sheets

METHOD AND APPARATUS FOR UNPACKING CONTENTS FROM ENVELOPES

BACKGROUND OF THE INVENTION

This invention relates to a method for mechanically unpacking contents from envelopes, in which an envelope is at least weakened along three of its folding edges, a first panel of the envelope is folded over relative to a second panel thereof about the fourth of the folding edges, the contents are mechanically separated from the envelope and are delivered, and the envelope is discharged separately from its contents along a discharge track.

Such a method is known for instance from French patent specification 346 891. In this known method, the contents of an envelope are delivered in one direction and, directly after the contents have been separated from the envelope, the envelope is discharged in the opposite direction to a suitable recipient.

An advantage of this known method is that the contents need not be removed from the envelope or off the envelope by hand. This is for instance necessary in methods as described in U.S. Pat. Nos. 4,893,454, 3,238,926 or 3,116,718, European patent application 0 048 485 or French patent application 2 135 481, where the envelope with the contents disposed therein or thereon is passed over a belt or through a channel and the contents must be taken from or off the envelope by hand.

Because it is no longer necessary to separate the contents from the envelope by hand, in each case a maximum amount of time is available for inspecting and, if necessary, arranging and sorting the contents. Moreover, as a consequence, relatively little concentration is required in picking up the contents, which prevents fatigue. The processing of mail can therefore be carried out at a relatively high speed.

A drawback of this known method, however, is that when a part of the contents of an envelope or the contents as a whole are discharged along with the envelope, the contents will end up in the recipient referred to and it is laborious to remove the contents from the recipient. The contents may for instance be discharged along with the associated envelope because the contents and the envelope cling to each other.

A further drawback of this known method is that when it appears, after inspection of the contents, that information must be added to the envelope, for instance because the address of the sender is only specified on the envelope, it is laborious to retrieve the discharged envelope and, moreover, the envelope is difficult to retrieve because it has already ended up in the recipient referred to.

The object of the invention is to provide a method in which the envelope is automatically separated from its contents, but in which an envelope that has been separated from its contents and any such parts of the contents as have been carried along with the envelope can be simply and quickly retrieved.

SUMMARY OF THE INVENTION

This object is accomplished according to the present invention in that at least one envelope separated from its contents is intercepted from the discharge track, and each time contents have been delivered, an interval follows before the associated envelope is discharged.

Because the emptied envelope is discharged along a discharge track from which that envelope can be removed, it can be intercepted before it reaches the recipient for emptied envelopes. Because, further, the discharge of an envelope is delayed for the duration of the interval referred to, the preceding envelope, until this interval has elapsed, need only be discharged over a distance which is sufficient to clear the means for separating an envelope from its contents and the means for transporting the contents to the delivery position. Thus this preceding envelope can still remain close to the operating side of the apparatus, where it is easily accessible to a person who inspects the contents of the envelopes. Before this interval has elapsed, inspection of the contents associated with the preceding envelope can be completed and that preceding envelope can, if necessary, be simply removed from the discharge track.

A further advantage of the method according to the invention is that waiting time for the operator can be avoided, in that, invariably, directly after contents have been removed from that delivery position, the next contents can be carried to the delivery position. Thus, the next contents can be carried to the delivery position and held in readiness while the operator inspects the preceding contents and, if necessary, arranges and sorts them.

The invention can also be embodied by an apparatus for unpacking contents from envelopes, comprising means for separating a first and a second panel of an envelope from each other along three folding edges, means for separating an envelope from its contents, means for delivering the contents, means for discharging an envelope separated from its contents, comprising a discharge track, wherein, according to the present invention, the discharge track is arranged on the outside of the apparatus and is open in an area between its ends, such that an envelope can be removed from the discharge track, and the apparatus comprises a control system designed for activating the means for discharging an envelope, in response to the elapse of an interval.

DETAILED DESCRIPTION OF A PREFERRED EMBODIMENT OF THE INVENTION

Figure 1:
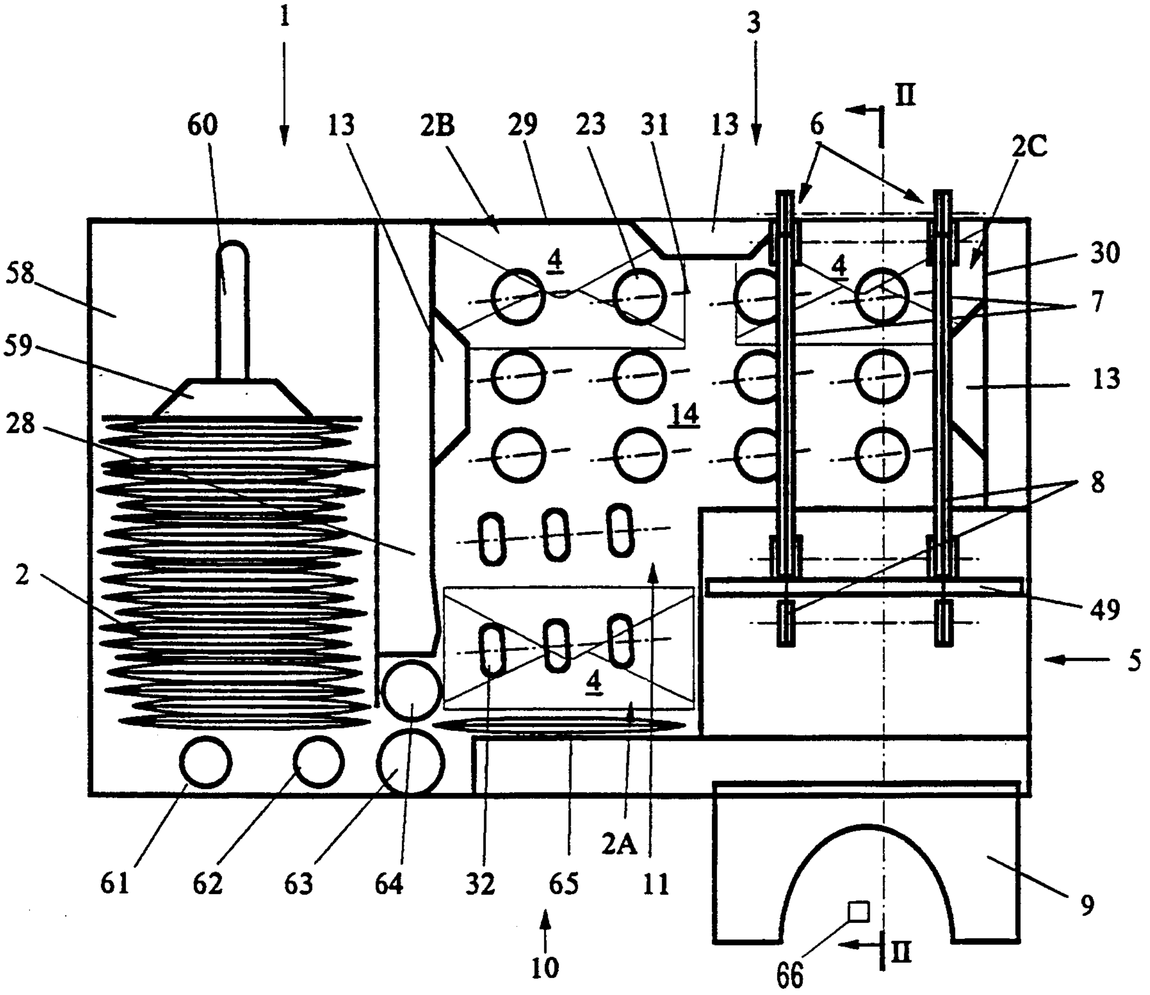
FIG. 1 is a top plan view of an embodiment of the apparatus according to the invention.
Figure 2:
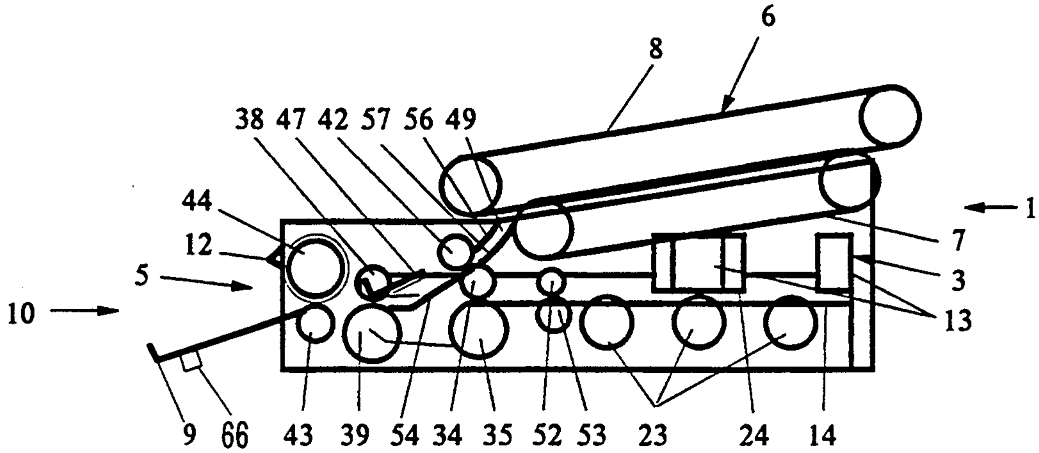
FIG. 2 is a sectional elevation of the apparatus shown in FIG. 1.

In the following description an envelope with its contents will be referred to as a postal item. It will be clear, however, that the embodiments can also be applied to the processing of envelopes with contents other than postal items (for instance ballot papers).

The apparatus according to the embodiments shown in the drawing comprises three main processing stations. First, a holder station 1 for receiving and delivering one-by-one postal items 2 to be processed. Secondly, a cutting station 3 for severing from each other a front wall and a rear wall of an envelope 4 of a postal item 2 along three of the folding edges of the envelope 4. And, thirdly, a separation station 5 for separating the envelope 4 from its contents. Instead of the station 1 for receiving and delivering one-by-one postal items to be processed, for instance an opening may be provided for feeding the postal items to be processed one by one by hand.

Connected to the separation station 5 is a discharge track 6, which is part of the means for discharging processed envelopes in a rearward direction. Behind the apparatus a suitable recipient (not shown) can be arranged, so that the processed envelopes are discharged to the recipient by the discharge track 6. On its operating side 10, the separation station 5 is provided with a receiving tray or bin 9 constituting a delivery position for contents which have been separated from an envelope. The receiving tray 9 can optionally be omitted, so that the delivery position is formed by an exit of the apparatus, preferably on the operating side. The contents can then be delivered directly into the operator's hands or discharged from that apparatus to a limited extent, so that a trailing part of the contents is retained and the contents can be pulled from the apparatus by the operator.

The discharge track 6 is arranged on the outside of the apparatus and is open in an area between its ends, such that an envelope can be removed therefrom. The separation station 5 is equipped with means for unfolding the envelope 4 and with means for transferring the envelope 4 to the discharge track 6 in unfolded position, such that the envelope 4 can be discharged with the former insides of the envelope walls facing away from the apparatus. The discharge track 6 is visible from the outside.

The apparatus comprises a control system that is designed for activating the means for discharging an envelope, in response to the elapse of an interval.

Because the discharge track 6 is arranged on the outside of the apparatus and is visible from the outside, envelopes 4 which are discharged along that discharge track 6 are visible to an operator of the apparatus for a length of time. Because, further, the envelope 4 is separated from its contents in such a manner that that envelope is unfolded and is discharged with its former insides facing away from the apparatus, it can be visually established very simply and quickly whether parts of the contents are being carried along with the envelope. Because the envelope is discharged as a single item, a check also requires inspection of only one item, which in turn requires a minimum amount of time.

Figure 3:
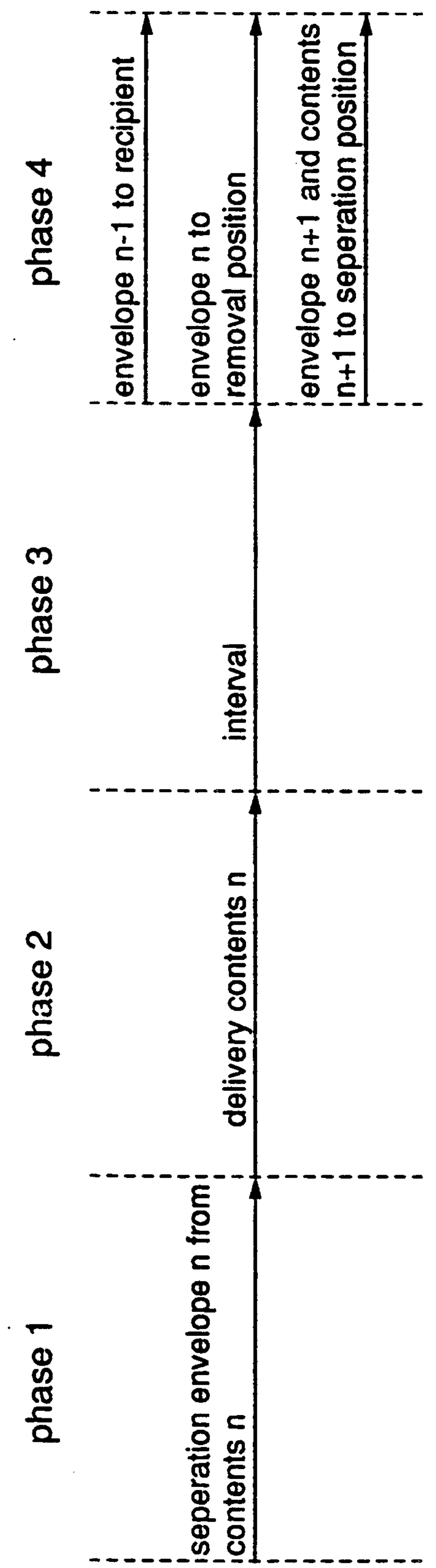
FIG. 3 is a schematic representation of an operating cycle of the method according to the present invention.

FIG. 3 is a schematic diagram of an operating cycle of the method according to the present invention. In phase 1 an envelope n is separated from its contents n. In phase 2 the contents n are delivered, namely, in the apparatus according to the embodiment shown, by discharging it into the receiving tray 9. In the known machine, (French patent 346 891), in phase 2 the envelope is moreover discharged into the recipient. According to the present invention, however, an interval follows (phase 3) before envelope n is discharged (phase 4) into a position in the discharge track from which it can be removed by the operator, if so desired. As a consequence, the preceding envelope n−1, until the elapse of this interval, need only be discharged over a distance that is sufficient to clear the means for separating an envelope from its contents and the means for transporting the contents to the receiving tray 9. The preceding envelope n−1 can thus still remain close to the means for separating the envelope from its contents, where it is easily accessible to a person inspecting the contents. Before the elapse of this interval, the associated preceding contents n−1 can be inspected and the associated envelope n−1, if so desired, can simply be removed from the discharge track 6. In phase 4, the envelopes n−1 and n+1 can be simultaneously transported to, respectively, the recipient and the position where envelopes can be separated from contents. The envelopes n−1, n and n+1 can of course be discharged with a delay relative to each other.

That an envelope n−1 need not make room for a subsequent envelope n is particularly advantageous because the envelopes are discharged along the discharge track in an unfolded position. Thus, each envelope has a length in the direction of transport that is twice its length in the direction of transport before it was unfolded. Accordingly, if an envelope n were discharged immediately after being separated from its contents, this envelope would have to be displaced over a relatively great distance so as to make room for the subsequent envelope n and, after inspection of the contents n−1 by the operator of the apparatus, would have been displaced over a great distance away from the operator.

A further advantage of the method according to the invention is that waiting time for the operator can be avoided in that, in each case, directly upon elapse of the interval, the next contents can be carried to the receiving tray 9. Contents n can thus be carried to the receiving tray 9 and lie in readiness there while the operator inspects the preceding contents n−1 and, if necessary, arranges or sorts them.

The above-mentioned interval preceding the discharge of an envelope n is preferably terminated in each case in that the contents n associated with that envelope are removed from the receiving tray 9.

By removing the contents n from the receiving tray 9 only after the inspection and, if necessary, arrangement and sorting of the preceding contents n−1 have been completed, the operator of the apparatus can provide for the envelope n−1 associated with the preceding contents n−1 not to be carried beyond his reach before he or she is finished with the processing of the associated contents n−1. The length of the interval is thus flexible and dependent on the time the operator requires for processing one contents.

In order to determine at what time the contents associated with a next envelope are removed from the receiving tray 9, the apparatus is preferably equipped with a sensor for detecting the presence of a document at the location of the receiving tray 9, which sensor is connected to the control system for terminating the interval in response to a signal indicating that a last document is removed from the delivery position. The sensor can for instance be designed as a photo-sensitive cell 66 in a position which is covered by any contents in the receiving tray 9, regardless of the dimensions of the contents. The sensor can also be constructed as an arm, resting on the contents adjacent an upright edge of the receiving tray. Upon removal of the contents from the receiving tray, the arm is lifted in that the contents are lifted over the edge referred to. In response to the lifting of the arm, the sensor applies a signal to the control system.

Instead of a sensor for detecting the removal of contents from the receiving tray 9, a sensor for detecting the motion of a hand of the operator can be employed.

When incoming mail that varies little is processed, it may be advantageous if the interval always has a constant time duration. Then, upon each delivery of contents, a fixed amount of time is available for the operator to intercept the associated envelope from a nearby position in the discharge track 6.

In order to carry out the method according to the invention using an interval of constant time duration, the apparatus may be provided with a timer for terminating the interval after elapse of a given time.

Preferably the timer is settable for setting the length of the interval.

It is further possible, during delivery of the contents, to carry the envelope along with the contents over a certain distance and during discharge of an envelope to separate a document that may be located on that envelope from that envelope. This offers the advantage that envelopes of relatively great length, when the contents are delivered, may project from the apparatus in the direction in which the contents are delivered. As a consequence, an envelope n which has just been unfolded occupies little space in the direction of discharge and therefore a preceding envelope n−1 need only be discharged over a limited distance to make room for the envelope n. The preceding envelope can therefore remain relatively close to the operator of the apparatus, so that it can be retrieved easily. A further advantage of the manner of carrying out the method according to the invention is that the means for separating the envelopes and the contents from each other can be of compact construction.

It is advantageous when the time during which the envelope can be inspected and, if necessary, intercepted is as long as possible. This can for instance be accomplished by discharging the envelope at a slow speed, for instance so slowly that the envelopes are discharged in a continuous row. In the apparatus according to the embodiment shown, however, this object is achieved by interrupting the discharge of the envelope while it is disposed in the discharge track, which is of such construction that the envelope can be removed therefrom. The stationary envelope can easily be inspected and, if necessary, be intercepted.

According to the embodiment of the invention shown, the discharge track 6 comprises upper and lower belts 7 and 8, respectively, of elastic material, between which an envelope can be clamped.

An envelope disposed in the discharge track 6 is visible between the upper belts 7. The envelope can be simply removed by hand from between the belts 7 and 8. The endless belts moreover offer the advantage that any part of the contents that has been carried along with the envelope is not separated from the envelope in an uncontrolled manner, which might lead to such part being missed or lost.

The discharge track 6 extends along the top of the apparatus, away from the operating side 10. This offers the advantage that the apparatus occupies a small area. A further advantage is that, on the one hand, the discharge track 6 extends within the operator's field of view, so that he can see quickly whether a part of the contents has been carried off with the envelope 4 and envelopes are properly visible for interception from the discharge track, and, on the other hand, empty envelopes are discharged away from the operating side 10, so that they do not occupy any space on the operating side 10.

According to the embodiment shown, the holder station 1 for feeding the postal items 2 one by one comprises a storage space 58, in which the postal items to be processed can be placed. Arranged in the storage space is a hold-down support 59 capable of moving along a guiding slot 60. The hold-down support 59 is connected with means (not shown) for pushing the stack of postal items 2 to be processed toward the operating side 10. Arranged on the operating side 10 of the storage space 58 are a support roller 61 and a feed roller 62. Further, adjacent the operating side 10 on the side of the cutting station 3, a transport roller 63 and a separation roller 64 are arranged, with the transport roller 63 being located on the operating side 10 of the separation roller 64. The separation roller 64 is resiliently pushed in the direction of the transport roller 63 and can be driven for feeding a postal item carried along with an outermost postal item back in the direction of the storage space 58. Further, the separation roller 64 is coupled with a slip coupling (not shown) which is set in such a manner that the separation roller 64 is driven by way of its circumferential surface if less than two postal items 2 are located between the separation roller 64 and the transport roller 63.

For processing a stack of postal items, the hold-down support 59 is moved away from the operating side 10 and the stack of postal items 2 is placed horizontally between the hold-down support 59 and the feed rollers 61 and 62, so that the envelopes are arranged in a row, one behind the other, in substantially vertical orientation. Then, the hold-down support 59 is pressed against the stack of postal items 2 for exerting a pressure force on the stack in the direction of the operating side 10. When the apparatus is operated for processing a postal item, the feed roller 62 and the transport roller 63 are set in motion. Further, the separation roller 64 is driven, which, however, rotates along with the transport roller 63 as long as there are not at least two postal items located between the separation roller 64 and the transport roller 63.

Through the action of the feed roller 62, the outermost postal item on the operating side 10 of the stack is moved to the transport roller 63 and, as soon as the item is engaged by the transport roller 63, carried along by that transport roller 63. After the transport roller 63 engages the outermost postal item, the drive of the feed roller 62 is uncoupled. Any following postal items which are drawn along by the outermost postal item are arrested by the separation roller 64 and, when these postal items have entered the area between the transport roller 63 and the separation roller 64, are returned to the storage space 58 by the separation roller 64.

The transport roller 63 carries the outermost postal item to the position before the wall 65 on the operating side 10 of the cutting station 3. Located opposite the guiding surface 14 is a wall 65 leaning toward the guiding surface 14. The postal items are supplied from the holder station 1 in a substantially vertical position. Owing to the wall 65 leaning toward the transport rollers 32, a postal item that has been supplied is tilted over towards the transport rollers 32. The postal item 2 is subsequently pressed against the transport rollers by pivoting a pressure roller (not shown) toward a transport roller, so that it is lifted, tilted further and carried along. Further details concerning the pressure roller and the transport rollers 32 are described in commonly assigned U.S. Pat. No. 5,175,979.

According to the embodiment shown, the cutting station 3 comprises a rectangular guiding surface 14, with, viewed from the operating side 10, a left-hand guiding edge 28, a rear guiding edge 29 and a right-hand guiding edge 30. The means for transporting a postal item along those guiding edges 28, 29 and 30 are constructed as rotationally symmetrical elements whose centrelines are parallel to the guiding surface 14 or form a small angle therewith. Each of the rotationally symmetrical elements is rotatable about its control shaft transverse to the guiding surface 14 and about its centreline. These rotationally symmetrical elements are shown as circles 23. Further details concerning the construction of the guiding surface 14 and the rotationally symmetrical elements are described in commonly assigned U.S. Pat. No. 5,222,585.

Each of the guiding edges 28, 29 and 30 is equipped with a substantially centrally located cutting member 13, operative at a slight distance from the respective guiding edge, for cutting open the envelope 4 along a folding edge. For severing the front wall and the rear wall of that envelope along three folding edges, the envelope is successively passed along the guiding edges 28, 29 and 30, and thus along the cutting members 13.

The station for cutting open an envelope along three folding edges further comprises a feed opening 11 between the holder station 1 and the separation station 5. In the area of this feed opening 11, transport rollers 32 have been arranged in oblique position relative to the left-hand guiding edge 28, so that postal items, as they are being transported through the opening 11, are forced against the left-hand guiding edge 28.

When feeding a postal item through the feed opening 11 from a position indicated by the reference numeral 2A, the rotationally symmetrical elements 23 are rotated, while the centrelines 31 thereof are maintained in a position substantially transverse to the left-hand guiding edge 28. The centrelines 31 can be maintained in a slightly oblique position, with the right-hand side of each of the rotationally symmetrical elements being located at a greater distance from the operating side 10 than is the left-hand side, as shown in FIG. 1. The postal item is thus forced continuously against the left-hand guiding edge 28. When passing the cutting member 13 provided along the left-hand guiding edge 28, the postal item is cut open along the folding edge of the envelope 4 that faces that left-hand guiding edge 28.

The postal item is transported along the left-hand guiding edge 28 until it reaches the rear guiding edge 29. The position wherein the envelope has reached the rear guiding edge 29 is indicated in FIG. 1 by the reference numeral 2B. Then, the rotationally symmetrical elements 23 are rotated about associated shafts transverse to the guiding surface 14 until the centrelines 31 have been brought into a position substantially transverse to the rear guiding edge 29. The centrelines 31 of the rotationally symmetrical elements can be maintained in an oblique position relative to the rear guiding edge 29 in the same way as described with reference to the displacement along the left-hand guiding edge 28. As the item passes the cutting member 13 along the rear guiding edge 29, the envelope is cut open along the second folding edge facing the guiding edge 29.

When the postal item subsequently reaches the right-hand guiding edge 30, the rotationally symmetrical elements 23 are rotated about the associated control shafts transverse to the guiding surface 14 in the same manner as when the postal item reached the rear guiding edge 29. The position wherein the envelope has reached the right-hand guiding edge 30 is indicated by reference numeral 2C in FIG. 1. By the elements 23, the postal item is subsequently passed along the right-hand edge 30 to the separation station 5. The envelope is meanwhile cut open along the third folding edge facing that guiding edge 30.

The cutting station as shown in FIG. 1 offers the advantage that the U-shaped configuration of the transport path of the postal items makes a compact construction possible, in particular if the cutting station 3 is designed for discharging postal items to the operating side 10. A further advantage is that the distance between the edges along which the front wall and the rear wall of the envelope are severed and the folding edge, is independent of the size of the envelope. The size of the envelopes to be processed is only limited by the distance from the cutting members 13 to the end of the guiding edge along which they are arranged. A yet further advantage is that the cutting station 3 has a high processing capacity in that each postal item needs to be passed along each severing member 13 only once.

According to the preferred embodiment shown, the separation station 5 comprises feed rollers 34, 35, 52 and 53 and a switch 54. The separation station 5 further comprises a receiving tray or bin 9 located on the operating side 10 for receiving processed contents and a discharge channel 49 bounded by walls 56 and 57, along which processed envelopes are passed to the discharge track 6. In a position indicated by thin lines, the switch 54 guides incoming postal items to the means for separating the envelope and the contents from each other and, in its position indicated by thick lines, guides processed envelopes to the discharge channel 49.

The means for removing the envelope from the contents comprise oppositely located separation rollers 43 and 44, pressure rollers 38 and 39 and a stop 47. Located opposite the feed roller 35 is a discharge roller 42 abutting the feed roller 34. Further details concerning the means for separating an envelope and its contents from each other are described in commonly assigned U.S. Pat. No. 5,179,820.

I claim:

1. A method for mechanically unpacking contents from envelopes, in which an envelope is at least weakened along three of its folding edges, a first panel of the envelope is folded over relative to a second panel thereof about a fourth of the folding edges, the contents are mechanically separated from the associated envelope and are delivered, and the envelope is discharged separately from its contents along a discharge track for allowing the envelope to be removed from the discharge track, and after each time contents have been delivered, an interval of time passes before the associated envelope is discharged to a position on the discharge track where the associated envelope can be removed.

2. A method according to claim 1, wherein in each case the contents are brought into a delivery position and said interval is terminated in that contents are removed from said delivery position.

3. A method according to claim 1, wherein the interval has a constant time duration.

4. A method according to claim 1, wherein, when the contents are being delivered, the envelope is carried along with at least a part of the contents over a given distance and, when an envelope is being discharged, any part of the contents that may be disposed on that envelope is separated from that envelope.

5. An apparatus for unpacking contents from envelopes, comprising means for separating a first and a second panel of an envelope from each other along three folding edges, means for separating an envelope from its contents, means for delivering the contents, means for discharging an envelope separated from its contents, comprising a discharge track, the discharge track being arranged on the outside of the apparatus and being open in an area between its ends such that an envelope can be removed from the discharge track, and a control system for activating the means for discharging an envelope after passage of a time interval following delivery of the contents of the envelope.

6. An apparatus according to claim 5, comprising a sensor for detecting the presence of delivered contents at a delivery position, said sensor being connected with the control system for terminating the interval in response to a signal indicating that a last contents is removed from the delivery position.

7. An apparatus according to claim 5, comprising a timer for terminating the interval upon elapse of a given length of time.

8. An apparatus according to claim 7, wherein the timer can be set for setting the length of the interval.

* * * * *